Figure 1:
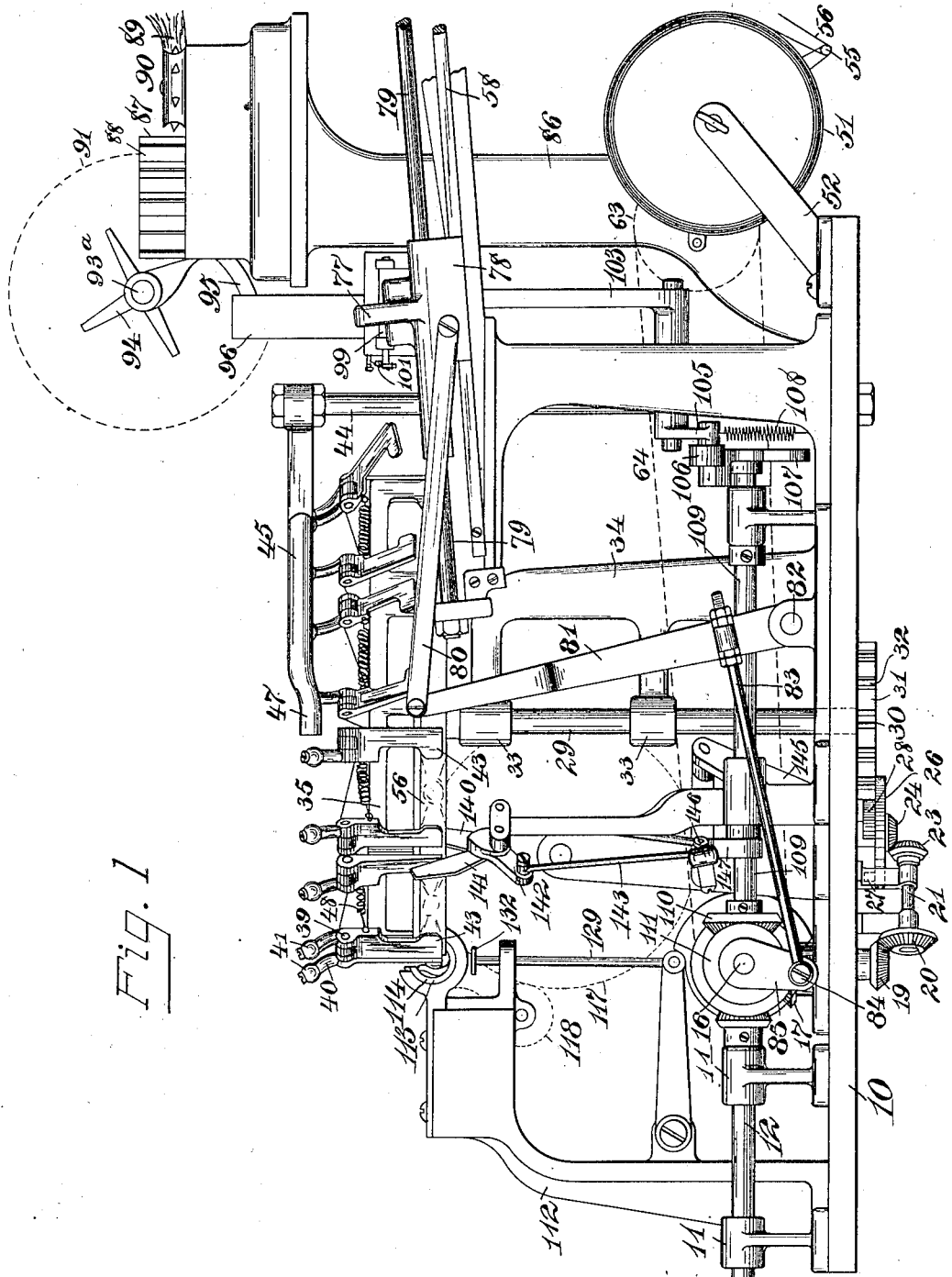

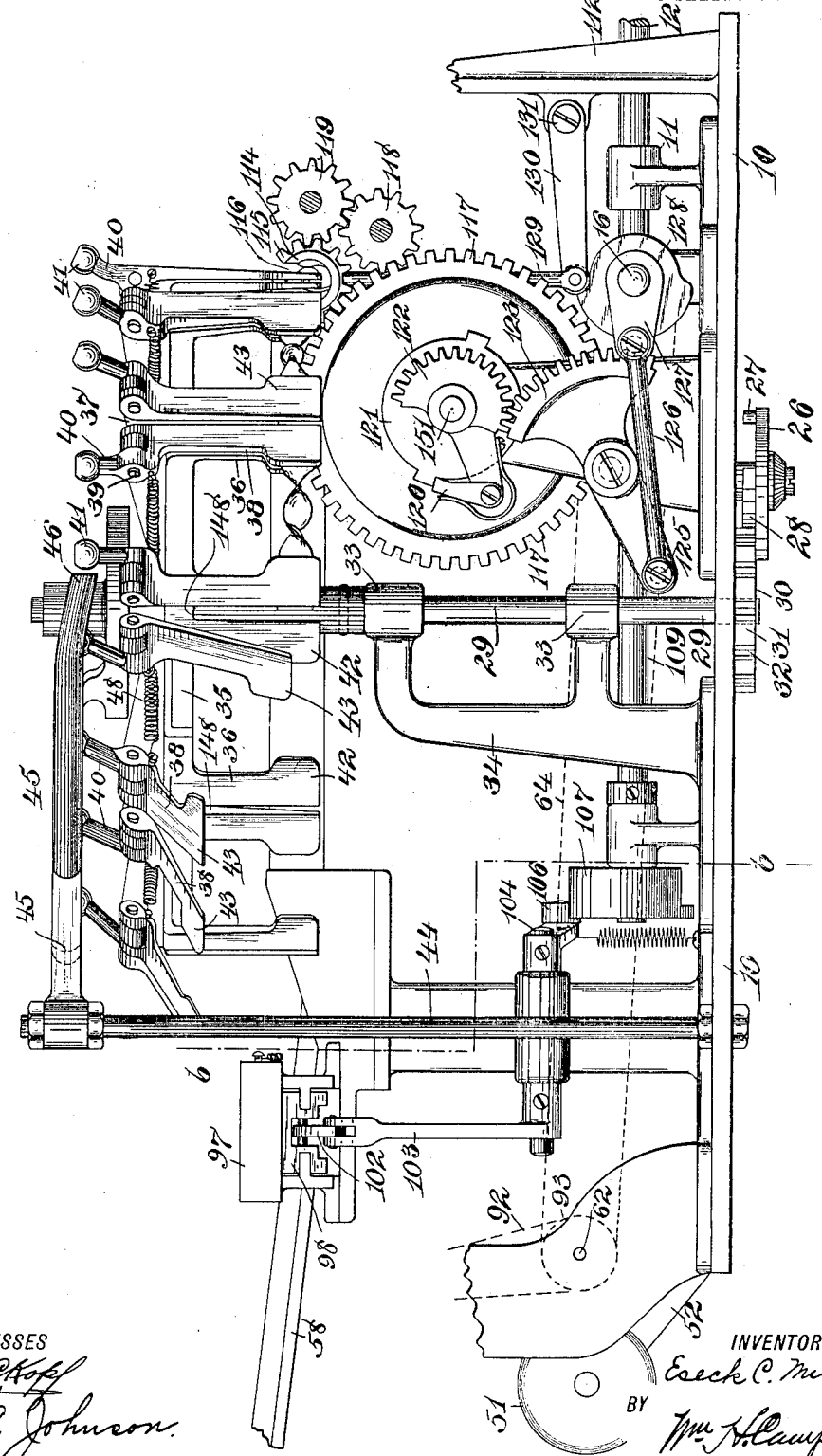

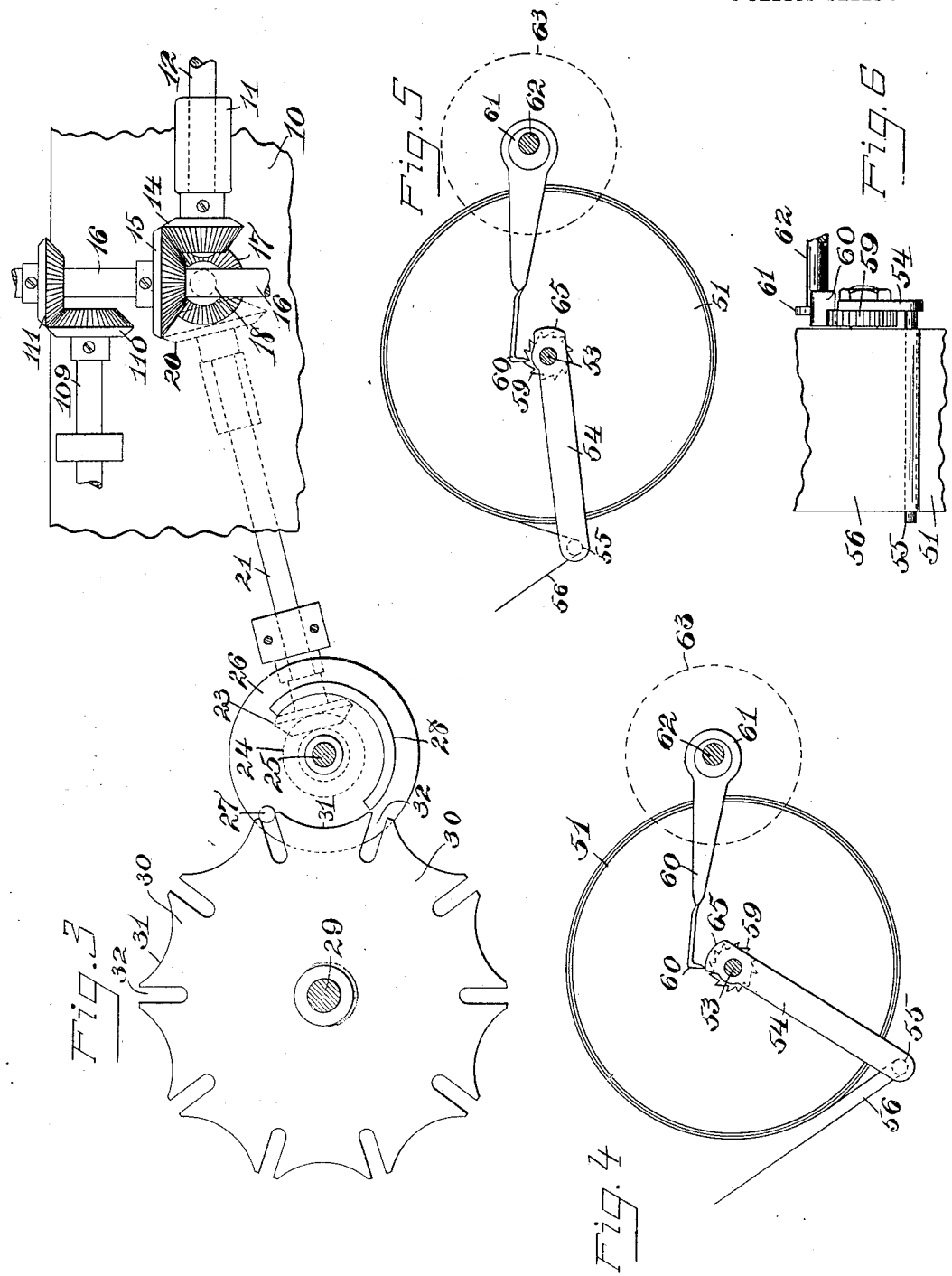

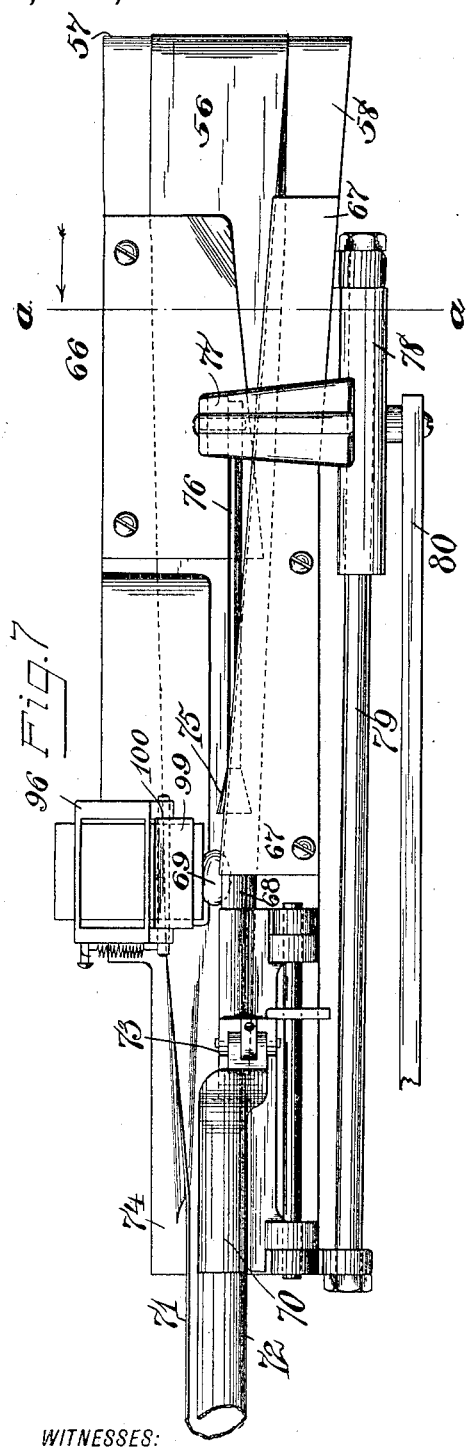

E. C. MILLER.
CANDY WRAPPING MACHINE.
APPLICATION FILED JULY 31, 1911. RENEWED JULY 5, 1913.
1,085,283.
Patented Jan. 27, 1914.
8 SHEETS—SHEET 5.
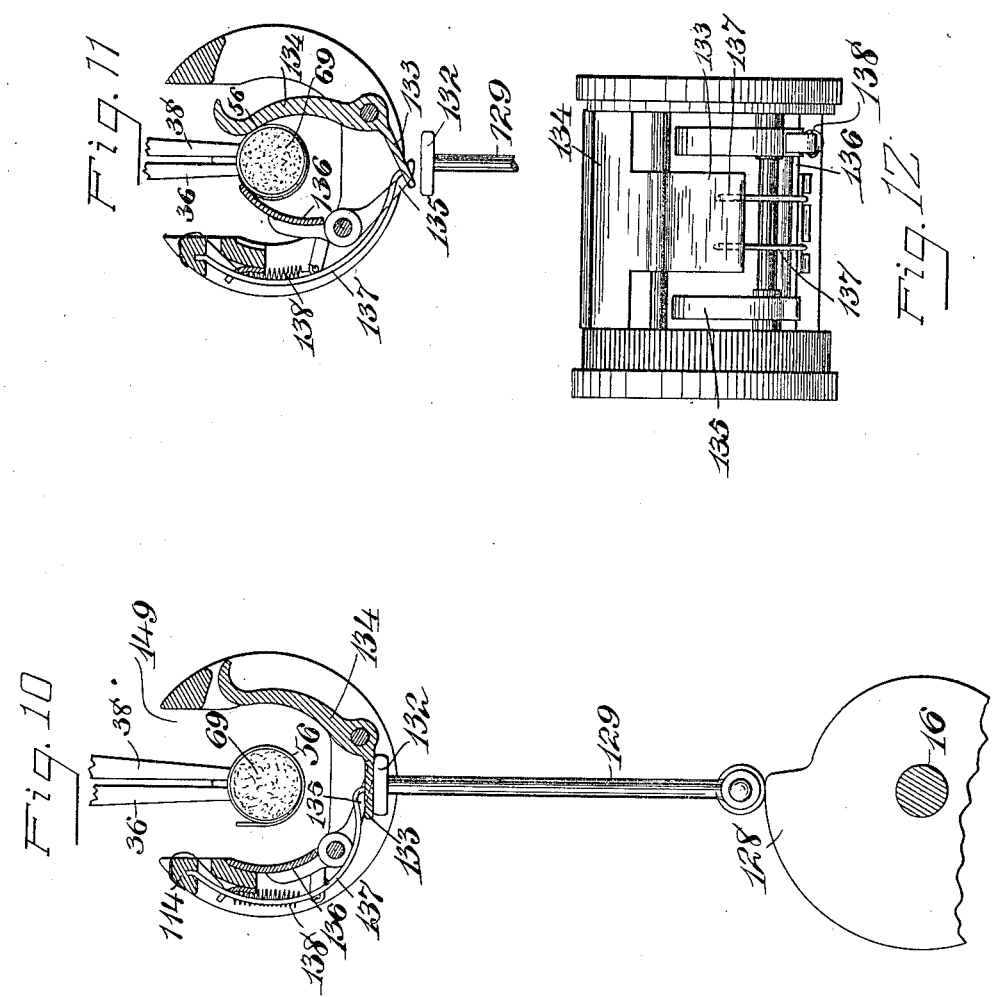
WITNESSES:
John C Koff
M. A. Johnson
INVENTOR
Eseck C. Miller
BY
Wm H. Caufield
ATTORNEYS

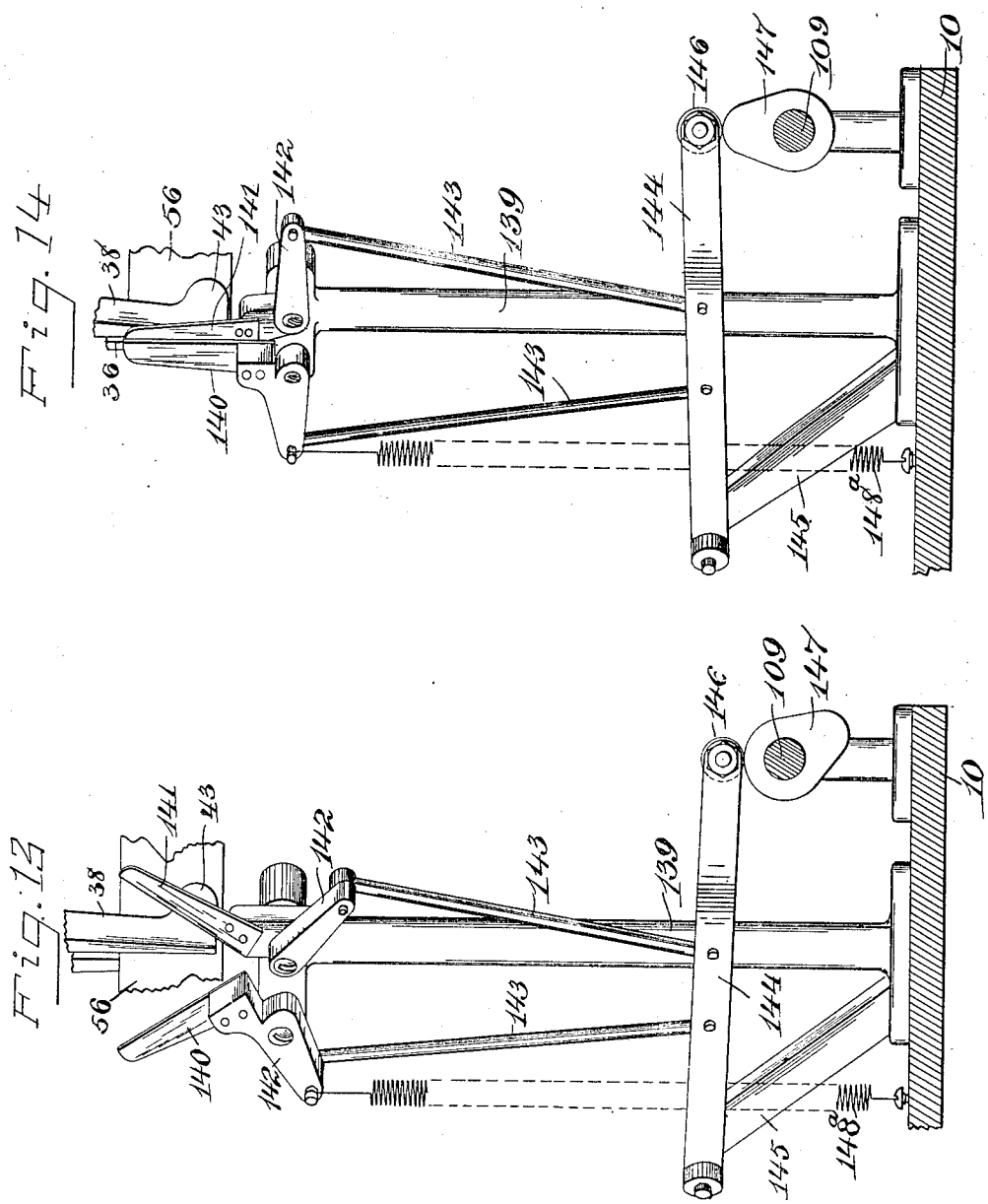

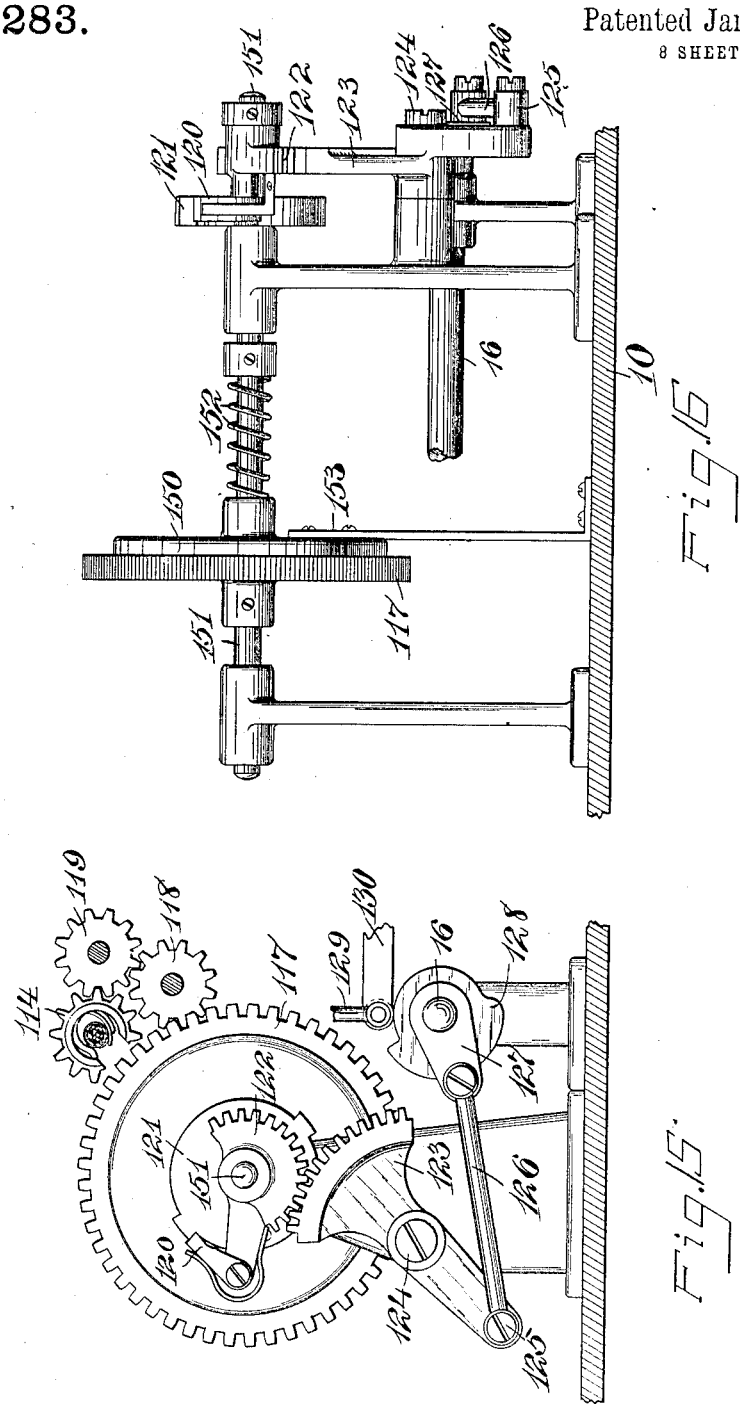

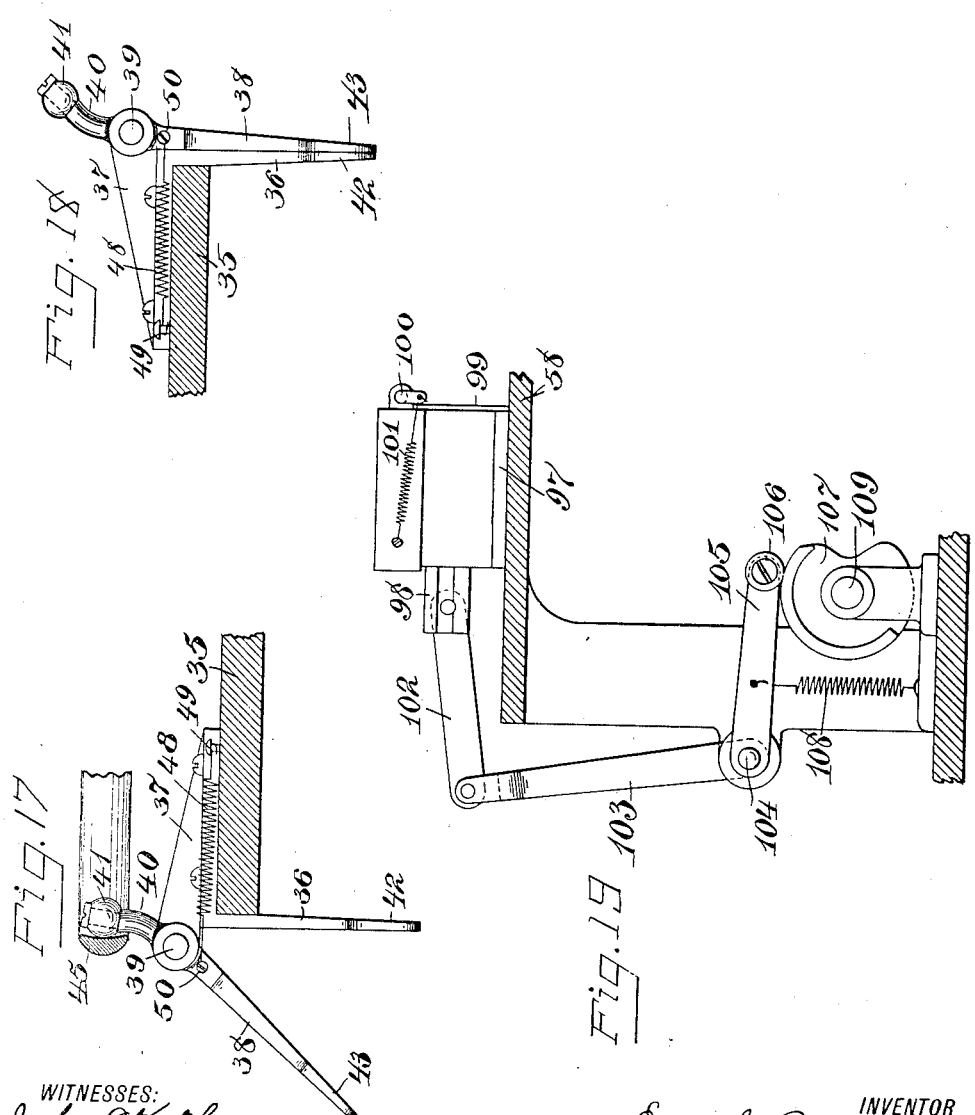

UNITED STATES PATENT OFFICE.

ESECK C. MILLER, OF NEWARK, NEW JERSEY, ASSIGNOR TO HOLDEN-MORGAN COMPANY, LIMITED, OF TORONTO, ONTARIO, CANADA, A CORPORATION OF ONTARIO.

CANDY-WRAPPING MACHINE.

1,085,283.     Specification of Letters Patent.     Patented Jan. 27, 1914.

Application filed July 31, 1911, Serial No. 641,622. Renewed July 5, 1913. Serial No. 777,497.

*To all whom it may concern:*

Be it known that I, ESECK C. MILLER, a citizen of the United States, residing at Newark, in the county of Essex and State of New Jersey, have invented certain new and useful Improvements in Candy-Wrapping Machines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a wrapping machine which feeds paper from a roll and forms the paper into a substantially tubular form, deposits articles, such as pieces of candy, one by one in the paper, then feeds this paper with the inclosed candy to clamps which have a step-by-step movement, the clamps being arranged in a series, one following the other, cuts the paper off between the clamps and after it is cut, successively presents each cut piece, which then forms a wrapper, with its inclosed candy to a tumbler which rotates and twists the package between the two clamps so as to twist the ends, and then automatically releases the twisted package so that it is dropped.

The invention consists particularly in a set of clamps which rotates with a step-by-step movement, the halts between the movements being utilized to twist the package presented to the tumbler and to cut off the approaching paper between the clamps.

Another object of the invention is to provide means for feeding the candy to the paper before the paper is entirely formed into a tube, and providing a plunger which slides the candy through the paper into its tubular portion and seats it between the two movable arms of a clamp so that each candy in turn is assured of its position in the center of the wrapper, or rather what is the center of the wrapper when the paper strip is cut off into its lengths.

The invention also provides a paper-feed which is automatically made inoperative when the roll of paper unwinds any excess paper so that the slack in the paper is taken up before the positive unrolling of the paper is resumed.

The invention further consists in the rotatable frame which forms the fixed part of the clamps and the swinging arms which are actuated by springs, these fixed arms providing means against which the tubular paper is pressed by the swinging arms, each pair of swinging arms forming a clamp in conjunction with the frame, a cam being provided to engage the swinging arms so as to swing them in opposition to the tendency of their springs to open them at a predetermined point to release the twisted package, and to permit the springs to act to again clamp a package when approaching the tumbler.

The invention is illustrated in the accompanying drawings, in which—

Figure 1 is a side view of the machine. Fig. 2 is an enlarged view of the wrapping portion of the machine taken from the side opposite to that shown in Fig. 1. Fig. 3 is a top view showing in detail the driving means of the shaft on which the clamps are mounted. Figs. 4, 5 and 6 are two side views and an end view of the paper-roll showing the feeding attachment both in operative and inoperative positions. Fig. 7 is a top view of the paper shaping mechanism, and also illustrating the plunger for advancing the candy through the paper tube. Fig. 8 is an enlarged end view of Fig. 7, and Fig. 9 is a section on line *a, a,* in Fig. 7. Fig. 10 is a section through the tumbler for twisting the package when the tumbler is open. Fig. 11 is a similar view when the tumbler is closed, but before it has started to rotate. Fig. 12 is an end view of the tumbler. Figs. 13 and 14 are views illustrating the cutter for severing the paper between the clamps. Fig. 15 is a side view of the apparatus for insuring the rotation of the tumbler. Fig. 16 is an end view showing the gear for operating the tumbler with a brake for steadying the motion thereof. Fig. 17 is a detail view of one of the arms of the clamp showing the coöperation with the fixed arm, the arms being open, and Fig. 18 is a similar view with the arms shown closed. Fig. 19 is a view taken on line *b, b,* in Fig. 2 showing the device for pushing the candy into the paper strip.

The machine consists of a base-plate 10 on which are standards 11, on which standards is mounted the driving-shaft 12, the shaft being provided with a pulley 13 by means of which it is rotated. A beveled gear 14 on the shaft 12 is in mesh with another beveled gear 15 on the cross-shaft 16, the beveled gear 15 being in turn in mesh with a beveled gear 17 which is mounted on a shaft 18 which extends down through the base 10 and through gears 19 and 20, operates a shaft 21 underneath the base, the shaft 21 having on its other end a miter-gear 23 meshing with a miter-gear 24, the gear 24 operating the shaft 25 which has thereon a disk 26 which is provided with a pin 27 and a locking flange 28. The main shaft 29 has a star-wheel 30 thereon provided with the recessed portions 31 and the slots 32, and it will thus be seen that as the machine operates and the disk 26 revolves, the pin 27 moves the star-wheel 30 by engaging the slots 32 successively to give the star-wheel a step-by-step movement and consequently the main shaft 29. After each progression of the star-wheel by the pin 27 the recess 31, which succeeds the slot last engaged by the pin 27, is held by the locking flange 28 in its position against any movement either forward or backward so that the shaft 29 is locked in position after each of its movements.

Mounted on the top of the shaft 29, which shaft rotates in suitable bearings 33 on a standard 34, is a frame 35, which frame is circular and is provided with a series of fixed arms 36 fastened to the top of the frame 35, and to each block 37 of a fixed arm 36 is pivoted a swinging arm 38, each swinging arm being pivoted as at 39 and having an extension 40 with an engaging surface such as a roller 41 on its top end. The roller 41 and the extension 40 provide means for swinging the movable or swinging arm 38. The ends of the arms 36 and 38 are widened as at 42 and 43, respectively. Each pair of arms face each other, forming a clamp as shown particularly in Figs. 1 and 2 to hold the paper strip or wrapper between them. Suitably mounted as on a rod 44 is a cam 45 which is engaged by the rollers 41 successively as the frame is rotated by the step-by-step movement as described before, and when the rollers engage the cam 45 on one side at the end 46, as shown in Fig. 2, they are opened, and when they leave the other end 47, as shown in Fig. 1, they are closed by the action of the springs 48, the springs being secured at one end as at 49 to the frame, and at the other end as at 50 to a swinging arm 38 so that they snap shut when released.

The paper which forms the wrapper for the package is supplied in a strip, the strip preferably coming from a roll 51 mounted in a bracket 52, the bracket being adapted to receive the shaft 53 on which the roll is mounted. Swinging loosely on the shaft 53 is an arm 54 which is provided with a rod 55 at its end, and the paper strip 56 passes under the rod 55 and then upward, and is then led over the end 57 of a platform 58 as shown in Fig. 7, being fed flat. Fastened on the shaft 53 is a ratchet 59 which is adapted to be operated by a pawl 60 worked by an eccentric 61 on the shaft 62, which shaft 62 is operated in turn by a sprocket-wheel 63 deriving its power from the chain 64 or its equivalent, which transmits the power it receives from the sprocket mounted on the cross-shaft 16, this pawl and ratchet arrangement insuring the feeding of the paper, but if too much force is given to the paper so that it unwinds quicker than it is used up, the slackness in the paper permits the rod 55 to fall to a vertical position carrying the arm 54 with it, and the fender 65 fastened on the end of the arm 54 swings to the position shown in Fig. 4, in contradiction to the position shown in Fig. 5, and the pawl 60 can not engage the ratchet 59 to feed the roll of paper until the slack has been taken up sufficiently to swing the fender around and allow the pawl 60 to again drop in engagement with the ratchet 59.

The flat paper strip is fed under a plate 66 on one side of the platform 58 and under a curling-plate 67 which folds the paper over while it is going through, as shown at 68 in Fig. 9, so that the paper is partly turned when it leaves the curling-plate 67 which is at a point above where the candy 69 shown in Fig. 7 emerges from a chute to be hereinafter described, and is deposited on the paper strip. The paper then proceeds through the former-plate 70 and is curled over to the shape shown in Fig. 8 with one side vertical as at 71, and the rest of the paper formed as at 72 in a substantially circular form, being held down by the former-plate 70 which is pivoted at its back end as at 73, being normally stopped in its downward movement in the position shown in Fig. 8, but being allowed to ride up if a particularly large candy is forced through, and in this way the former-plate gives and the paper is not torn. The side 71 of the paper strip 56 bears against the wall 74 of the platform 58, this substantially tubular formation of the paper being then fed out from the end of the former which is on a level with the ends of the arms 36 and 38 of the clamps, and grasped as each arm successively comes from under the end 47 of the cam 45 and flattened by the secure grip of the clamps. In the meantime the candy 69 which was deposited in the position shown in Fig. 7, is pushed forward by the head 75 of a plunger 76 which has its inner end mounted to freely swing in an arm 77 secured to a sleeve 78 which slides on the rod 79, the rod being fastened at its two ends parallel with the passage of the paper strip, the sleeve being reciprocated by a link 80, the link 80 being fastened at one end to the sleeve 78, and at its other end to the lever 81 which is pivoted at 82, and in order to multiply the throw of the lever 81 it is operated from near the pivot 82 by a connecting rod 83 which is operated from its end 84 by a crank 85 mounted on the end of the cross-shaft 16.

Mounted on a suitable standard 86 at the rear of the machine, are a pair of rolls 87 which are provided with wings 88 as formed in the usual type of kiss-forming machine, these wings acting as cutters. I take a long strip of candy 89 which is fed by the feed-rolls 90 and divide it up in pieces or lumps, this kiss-making apparatus which is not new being driven by a sprocket 91 connected by means of a chain 92 and the sprocket 93 on the shaft 62. The sprocket 91 is mounted on a shaft 93ᵃ, and the wings 94 insure the descent of the pieces of candy down the runway 95 into a chute 96, which chute is vertically arranged and is provided with a bottom 97 which has a slide-piece 98 therein, which slide-piece pushes the piece of candy 69 up against the flap 99 which is pivoted at 100 and is normally held shut by the spring 101. The candy being thus pushed out is deposited at the point shown at 68, the slide-piece 98 projecting into the tube or chute to prevent the ejection or escape of more than one piece of candy at a time, the slide-piece being pushed forward at the proper time by a link 102 on a lever 103, which lever is operated from the shaft 104 which in turn is operated by the arm 105 with a roller 106 held in contact with a cam 107 by the spring 108. The cam 107 is mounted on a shaft 109 which is driven by a gear-wheel 110 in mesh with the beveled gear-wheel 111 on the shaft 16.

On a bracket 112 I have mounted a pair of jaws 113 in which is arranged the tumbler 114, the tumbler being shown in detail in Figs. 10, 11 and 12. The tumbler is provided with a gear 115 which is recessed as at 116 (Fig. 2), the teeth of the gear 115 meshing with the main gear 117 and also with the two idle-gears 118 and 119 which are in mesh with each other, with the main gear 117 and with the gear 115. The function of these idle-gears is shown particularly in Fig. 15, as the main gear 117 when rotated by means of the pawl 120 and the ratchet 121, by means of the segmental gear 122 with the curved rack 123 swinging on the pivot 124 and being operated from its projecting end 125 by means of the link 126, causes a continuous rotation of the tumbler as when the recess comes opposite the main gear as in Fig. 15 it is still propelled by being in mesh with the gear 119. The link 126 is connected to a crank 127 mounted on the cross-shaft 16. On the cross-shaft 16 is a cam 128 which is used to operate the rod 129 which swings on an arm 130 pivoted at 131 on the bracket 112. The upper end of the rod 129 has a plunger 132 which is forced by the cam 128, at a certain point in its rotation, to engage the end 133 of a clamping-arm 134 and also the end 135 of a clamping-arm 136, the end 133 of the clamping-arm 134 being normally pressed down against the head 132 with a tendency to force the clamping-arm 134 by means of a spring 137. The end 135 of the clamping-arm 136 is normally pressed down by a spring 138 fastened at one end to the clamping-arm 136 and its other end to the tumbler 114. It will thus be seen that an upward pressure on the rod 129 causes the tumbler to remain open to receive a package between the opposed pairs of arms of a clamp, and when the cam releases the rod 129 as shown in Fig. 11, the springs 137 and 138 are allowed to operate to cause the arms 134 and 136 to grasp the candy.

To insure the paper being cut off at proper lengths, that is, between clamps, I provide a cutting attachment illustrated in detail in Figs. 13 and 14, being shown also in Fig. 1. A support 139 has pivoted thereto a pair of blades 140 and 141, each of which has a link 143 connected to its arm 142 and connected at the bottom to a lever 144 which is pivoted at one end to a projecting arm 145 and being operated at its end by means of a roller 146 which in turn is engaged by a cam 147, which cam is mounted on the shaft 109. A spring 148ᵃ holds the cutting attachment normally open. The machine is so constructed and regulated that the rotating frame with the clamps thereon is locked in position between its step-by-step movements. A recess 148 (Fig. 2) between the arms of two adjacent clamps is in register with the swinging blades 140 and 141 of the shears so that the paper can be cut off between clamps, and the set of clamps holding the package next to be twisted is held within the tumbler 114. The tumblers are recessed as at 149 in register with the recess 116 of the gear 115 to permit the passage transversely through it of the package before and after being twisted or wound.

To prevent the main gear 117 from being thrown beyond its normal place by the pawl 120 acting against the ratchet 121, I provide a friction-brake 150 which is a plate mounted on the shaft 151 on which the main gear 117 rotates and being adapted to slide on said shaft, being normally pressed by a spring 152 and held against rotation by a strip 153 fastened to the base 10. This prevents any "overthrow" of the gear so that the tumbler when through with the twisting operation of the package is left in its normal position, that is, with the recess of the tumbler frame and of the gear projecting in position to allow the free passage of the clamps holding the packages.

The operation of the machine is as follows: The candy strip is inserted between the feed-rolls 90 of the kiss-cutter or other machine for making candy into small pieces or lumps from a strip, and the paper in the shape of the roll 51 is put in place, the paper being run underneath the rod 55 in the end of the arm 54, then up over the end of the platform 58. The paper is fed by hand through the curling-plate 67 and the former-plate 70, and its end is then clamped in the closed clamp nearest the end 47 of the cam 45 and the machine is then ready to start. The rotating shaft 109 operates to force a candy piece 69 out of the bottom 97 of the chute 96 by means of the slide-piece 98 by allowing it to be actuated through the arm 105 which is pulled down by the spring 108. This causes the candy to be placed in the position shown in Fig. 7, or rather a little more within the fold, since the candy in Fig. 7 is shown in the act of emerging from the bottom of the chute. As soon as the candy is in place the rod 76 with its plunger 75 is forced forward by means of the crank 85 operating through the intermediate connection above described, to push the candy through the paper tube to a position between the opposed pairs of arms of a clamp so that it is approximately centered between the opposed ends of the clamps. It will be noticed in Fig. 1 that each pair of arms coöperates with another pair to form a clamp, the coöperating pairs having their enlarged ends 42 and 43 turned toward each other. The crank 85 in its rotation causes the plunger to be at once withdrawn, after placing the candy, to its position shown in Fig. 7.

During the above described operation the locking flange 28 has been engaging a recess 31 of the star-wheel 30, and by the time the candy is in place and the plunger starts to retreat, the pin 27 engages a slot 32 and the star-wheel is turned with its shaft 29 to rotate the frame 35 and its clamps a space equal to the width of a clamp and then again lock it in place. This step-by-step movement causes successive clamps to engage the paper strip just beyond the end 47 of the cam 45 and to advance the candies as above described after each movement of the clamps, the clamps when emerging from underneath the end 47 being snapped shut by their springs 48, and at each halt of the frame 35 the cutting apparatus consisting of the shear-blades 140 and 141 is caused to swing to cut off the paper in the position shown in Fig. 1. by reason of the links 143 being operated through intermediate means from the cam 147 on the shaft 109. Likewise at each stop of the frame with the clamps and the consequent locking of the frame, the crank 127 swings the segmental gear 123 by means of the lever 126 and forces the pawl 120 to rotate the ratchet 121, consequently the main gear 117. This rotation of the gear 117 causes a turning of the tumbler, the tumbler having previously gripped the package at present within it as shown in Fig. 11, since the plunger 132 is allowed to retreat by the cam 128, and the package being securely held in the rotating tumbler, and the ends of the paper wrapper being held fast at its ends in the clamps, the ends of the paper beyond the candy is twisted to securely wrap the candy within the paper, as will be understood. At the next movement of the frame the candy previously wrapped passes on and each successive movement carries it farther around until the extension 40 of the pair of clamps holding the package is swung underneath the end 47 and under the cam 45 and the clamps are thus swung open, permitting the wrapped package to drop into a suitable receptacle and a suitable chute, or wherever it is desired to have them deposited.

The paper-feeding device which is illustrated particularly in Figs. 4, 5 and 6, insures a positive feeding of the paper and also insures no excess feed and takes the strain from the paper strip so that it is not apt to become torn in the feeding thereof, since by the time the tension on the paper becomes fairly tight, the arm 54 has been raised high enough to permit the pawl 60 to engage the ratchet 50 and positively feed the paper from its roll once more without an excessive pull on the paper strip itself. It will be noted in this case that the step-by-step movement of the frame with the clamps thereon, and the folded strip of paper carried by clamps, each fold having a candy or similar article therein between the clamps, with the automatic means for clamping and unclamping the package between the clamps, and the twisting of the successive clamped pieces at each halt of the frame, go to make up a machine that is economical, rapid, does not tear the papers and is a sanitary and clean device.

It will be noted that the candy is made in a strip and from the time it enters the machine in the strip form until it is wrapped, it does not come in contact with the hands of the operator and is for the major portion of its length covered to prevent access of dust and dirt thereto. It will also be noted that as a kiss-wrapper, and in fact for wrapping packages of any kind that have twisted ends, the machine is complete and operative and has given good results in actual operation.

Having thus described my invention, what I claim is:—

1. In a wrapping machine, a rotary frame, a set of clamps on the frame, means for giving the frame a rotary step-by-step movement, means for engaging the clamps to open and shut them at points in their rotation, means for feeding a folded strip of paper to the clamps, means for depositing an article to be wrapped in the folded paper between clamps, means for severing the paper strip into wrappers, a tumbler for engaging each article within a wrapper successively and rotating it to twist the ends of the wrapper between the article and the clamps, and means for operating the tumbler from the frame-rotating means while the frame and its clamps are at rest.

2. A wrapping machine comprising a rotary frame having a series of clamps thereon, the clamps being adapted to secure a folded paper strip, the strip between each set of clamps forming a wrapper, means for depositing a package within each wrapper, means for severing the said paper strip into wrappers, means for imparting a step-by-step movement to the frame, a tumbler to engage each package successively and being recessed to receive the clamps and the package transversely and permit the passage of the clamps therethrough, means within the tumbler for grasping each package as it is presented at a halt of the frame, and means for rotating the tumbler to twist the wrapper between the article and the clamps while the frame and its clamps are at rest.

3. A wrapping machine comprising a frame, a set of clamps on the frame, means for opening and closing the clamps at certain points in the rotation, means for giving the frame a step-by-step movement, means for presenting a folded strip of paper to the clamps at a point where they close, means for depositing an article in the folded paper between clamps, a tumbler for engaging each article successively and rotating it so as to twist its wrapper between the article and the clamps, and means for operating the tumbler while the clamps are at rest.

4. A wrapping machine comprising a rotary frame, means for giving the frame a step-by-step movement, a set of clamps on the periphery of the frame, each clamp consisting of a fixed arm and a swinging arm having an extension thereon, a spring engaging each clamp to hold the swinging arm against the fixed arm, a cam engaging the extensions of each clamp at a certain point in its rotation to hold it open against the action of its spring and releasing the extensions to permit the clamps to close, means for feeding a folded paper strip to the clamps at the point where they close, means for severing the strip between each pairs of clamps to form independent wrappers, means for depositing the article to be wrapped within the folded strip between the clamps at a point about to be engaged by a closing clamp, and a tumbler for engaging the articles in the wrappers successively at the successive halts of the frame and its clamps.

5. A wrapping machine comprising a rotating set of clamps, the clamps being arranged in pairs and adapted to hold a paper wrapper between each pair of clamps, means for automatically inserting a folded paper strip in the clamps, means for severing the strip into individual wrappers between each pair of clamps, and a tumbler for engaging the articles within the wrappers successively to twist the article and the wrapper between the clamps, and means for rotating the tumbler.

6. A wrapping machine comprising a rotary frame, means for giving the frame a step-by-step movement, a set of clamps on the frame, means for opening and closing the clamps, means for conducting and forming a paper strip in tubular form to the clamp when open, means for depositing an article to be wrapped in the formed paper, and means for rotating the article to be wrapped and the paper between clamps while the frame is at rest.

7. A wrapping machine comprising a rotary frame, means for giving the frame a step-by-step movement, a set of clamps on the periphery of the frame, means for opening and closing the clamps automatically at predetermined points in the rotation of the frame, means for feeding wrapping material to the clamps when they are open, means for depositing an article to be wrapped in the material, and a means for rotating the deposited article and its wrapper to twist the material between the article and the clamps, said last-mentioned means being operable when the frame is at rest.

8. A wrapping machine comprising a rotary frame, means for giving the frame a step-by-step movement, a set of clamps on the periphery of the frame, means for opening and closing the clamps automatically at predetermined points in the rotation of the frame, means for feeding wrapping material to the clamps when they are open, means for depositing an article to be wrapped in the material, means for severing the wrapping material between certain clamps to form material between certain clamps to form wrappers, and a means for rotating the deposited article and its wrapper to twist the material between the article and the clamps, said last-mentioned means being operable when the frame is at rest.

9. A wrapping machine comprising a rotary frame, means for moving the frame with a step-by-step movement and locking the frame when it halts, clamps on the periphery of the frame, means for opening and closing the clamps as they rotate, means for feeding wrapping material to the open clamps, means for severing the material into independent wrappers after the clamps are closed, means for depositing an article to be wrapped in the wrapping material, and a tumbler for twisting the articles and the wrappers between clamps.

10. A wrapping machine comprising a rotary frame, clamps consisting of two jaws, the clamps being mounted in pairs, means for holding the jaws shut, means for opening the jaws, means for feeding folded wrapping material to the open jaws, a cutter for severing the wrapping material between the outer clamps of adjacent pairs of jaws so as to form wrappers, and means for twisting each wrapper between its clamps, the clamp-opening means operating after the twisting to drop the twisted wrapper.

11. A wrapping machine comprising a rotary frame, depending clamps arranged on the periphery of the frame, means for rotating the frame, a rotatable tumbler recessed to permit the passage of the clamps through it, said tumbler being adapted to clasp material, means for causing the tumbler to clasp an element, and means for rotating the tumbler.

12. A wrapping machine comprising a rotary frame, clamps on the frame, each clamp consisting of a fixed jaw and a swinging jaw, springs to close the jaws, means for rotating the frame, an extension on each swinging jaw, a cam so disposed that it opens each clamp as the cam engages its extension, means for feeding wrapping material to the clamps, and means for twisting the material between clamps.

13. A wrapping machine comprising a rotary frame, means for giving the frame a step-by-step movement, clamps arranged in pairs, each clamp comprising a fixed jaw and a swinging jaw, each swinging jaw having an extension thereon, a spring acting to force each swinging jaw to a closed position, a cam so disposed that it engages the extension of the jaws successively to open them, means for feeding wrapping material to the jaws while they are open, means for depositing an article to be wrapped to the wrapping material between the opposed clamps of each pair, and a tumbler arranged to twist the wrapping material and its inclosed article while the rotary frame is at rest.

14. A wrapping machine comprising a rotary frame, means for giving the frame a step-by-step movement, clamps arranged in pairs, each clamp comprising a fixed jaw and a swinging jaw, each swinging jaw having an extension thereon, a spring acting to force each swinging jaw to a closed position, a cam so disposed that it engages the extension of the jaws successively to open them, means for feeding wrapping material to the jaws while they are open, means for depositing an article to be wrapped in the wrapping material between the opposed clamps of each pair, a tumbler recessed to permit the passage of the clamps and the articles through it, means within the tumbler for grasping an article suspended within the tumbler, and means for causing the tumbler to grasp and rotate an article and its wrapper while the frame is at rest.

15. A wrapping machine comprising a set of clamps, means for moving the clamps, means for guiding a strip of paper to the clamps, means for suspending a roll of the paper that is fed to the clamps, means for moving the clamps, a shaft, a paper suspending means on which the roll is mounted, a ratchet on the shaft, a pawl engaging the ratchet, means for operating the pawl whereby the ratchet is rotated to feed the paper, an arm swinging on the shaft, a rod on the arm, said rod resting on the paper between the roll and the conducting mechanism, and a fender on the arm so disposed that it disengages the pawl from the ratchet when an excess of paper is fed permitting the arm to fall.

In testimony that I claim the foregoing, I have hereunto set my hand this 18th day of July 1911.

ESECK C. MILLER.

Witnesses:
WM. H. CAMFIELD,
M. A. JOHNSON.